Figure 1:
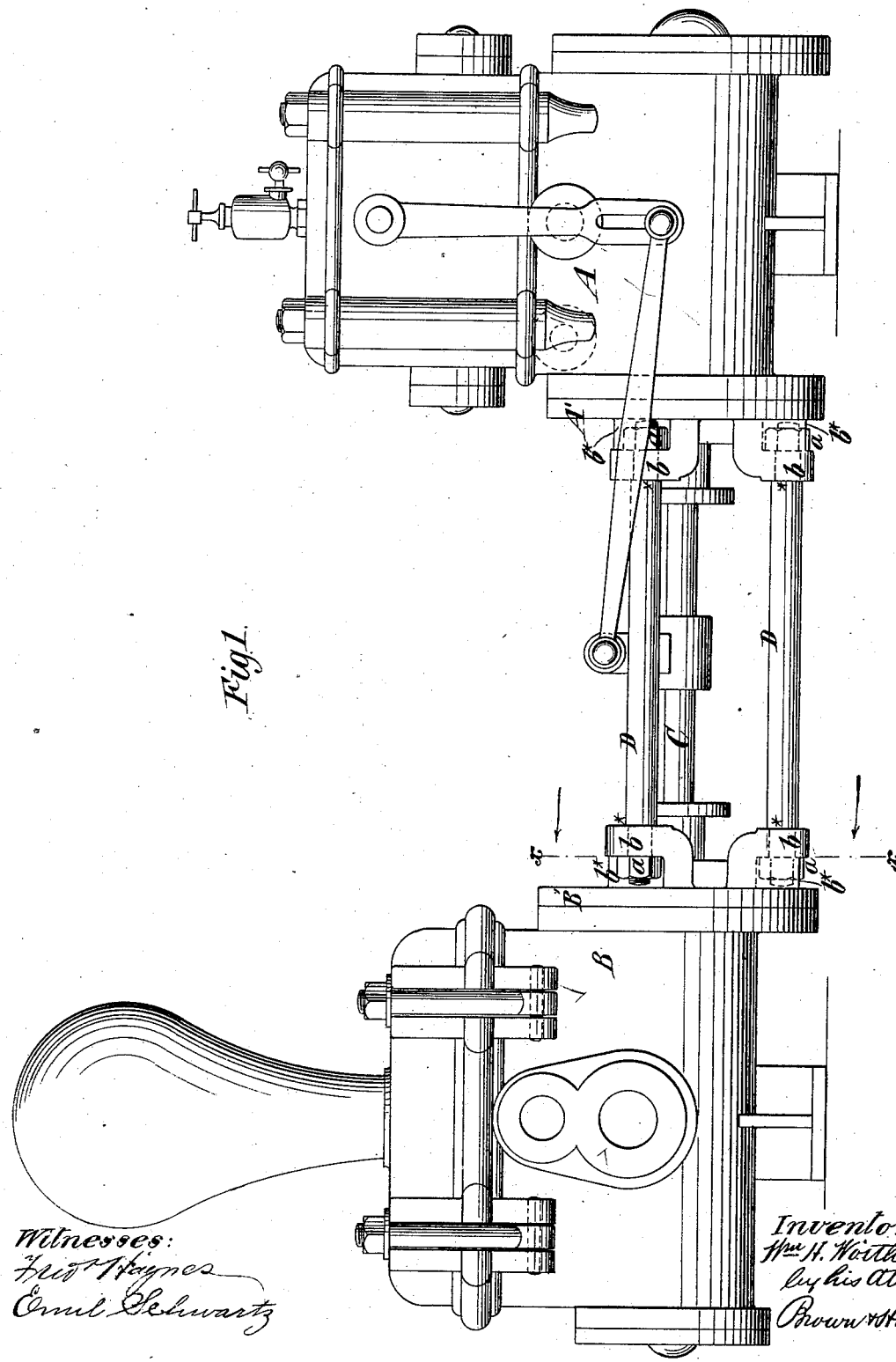

(No Model.) 2 Sheets—Sheet 1.

W. H. WORTHEN.
DIRECT ACTING PUMPING ENGINE.

No. 314,161. Patented Mar. 17, 1885.

Witnesses:
Fred Haynes
Emil Schwartz

Inventor:
Wm. H. Worthen
by his Attys.
Brown & Hall (No Model.) 2 Sheets—Sheet 2.
W. H. WORTHEN.
DIRECT ACTING PUMPING ENGINE.
No. 314,161. Patented Mar. 17, 1885.
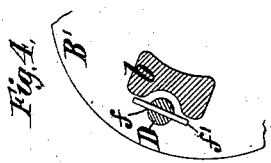
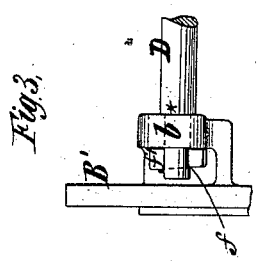
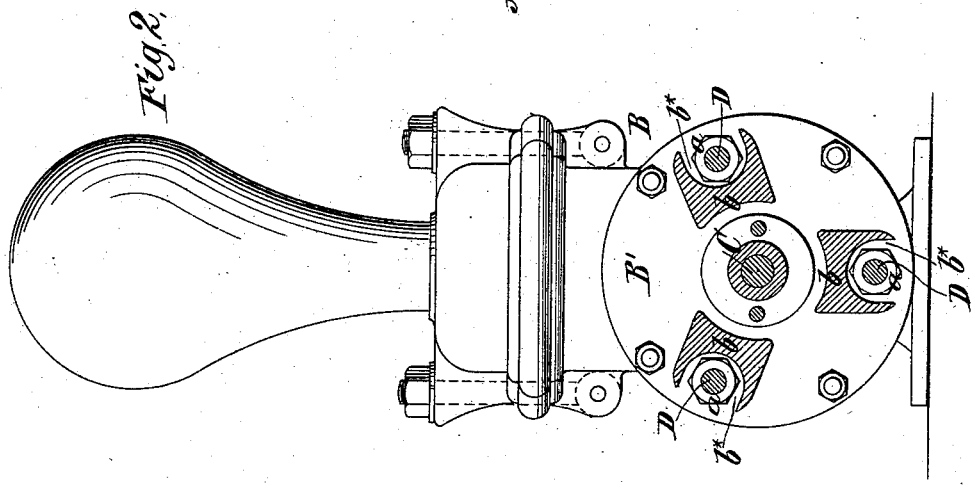

United States Patent Office.

WILLIAM H. WORTHEN, OF BROOKLYN, NEW YORK, ASSIGNOR TO GUILD & GARRISON, OF SAME PLACE.

DIRECT-ACTING PUMPING-ENGINE.

SPECIFICATION forming part of Letters Patent No. 314,161, dated March 17, 1885.

Application filed November 3, 1884. (No model.)

*To all whom it may concern:*

Be it known that I, WILLIAM H. WORTHEN, of the city of Brooklyn, in the county of Kings and State of New York, have invented a new and useful Improvement in Direct-Acting Engines, of which the following is a specification.

My invention is applicable generally to direct-acting engines having cylinders arranged in line with each other, but is more particularly intended for steam-pumps of that class.

The invention relates to the construction of the cradle, brace, or trunk which connects the two cylinders and holds them in line, and which has been composed of a number of wrought-iron rods (three usually being employed) which extend parallel with the piston-rods, and have their ends rigidly secured in or to the cylinders or their heads. The ends of these rods have been secured in various ways. In some cases they have been provided with nuts and shoulders and inserted through lugs projecting from the cylinder-flange beyond the periphery of the head; but this method is objectionable because the cradle formed by the rods is of large size, and if any attempt is made to reduce it by cutting away or notching the cylinder-head opposite the rods, the joint which the head forms with the cylinder-flange is so reduced in extent as to entail liability of leakage. In other cases the cylinder-head has been formed integral with the cylinder and the screw-threaded and shouldered ends of the rods tapped into the integral head. This method provides for making a cradle which is of small size transversely, but is objectionable because the holes into which the rods are screwed open directly into the cylinder, thus entailing liability of leakage, and because of the difficulty of separating the cylinders when necessary for repair or any other purpose.

The object of my invention is to so secure the rods to the cylinder-heads as to produce a cradle of small size without any of the objections above referred to. To this end I form the rods of the cradle with shoulders and provide them with nuts or securing devices at their ends, and I construct the cylinder-heads with lugs or ears offset sufficiently from their faces in a direction lengthwise of the cylinder to enable the nuts or devices to be introduced behind them or between them and the head, and provided with holes or apertures, through which the ends of the rods are inserted.

Although I prefer to secure both ends of the rods to both cylinder-heads in the manner described, the advantages of my invention may be secured in part by applying the invention to one cylinder-head only, and securing the opposite ends of the rods in or to the opposite cylinder or head in any well-known manner, and for this reason I desire to include in my invention a direct-acting engine having the rods secured to one or both cylinder-heads in the novel manner above described.

In the accompanying drawings, Figure 1 is a side elevation of a direct-acting engine or steam-pump embodying the invention. Fig. 2 is a transverse section on the plane of the dotted line $x$ $x$, Fig. 1, looking in the direction indicated by the arrows. Fig. 3 is a side view of a portion of a cylinder-head and one rod; and Fig. 4 is a sectional view of one lug or ear and rod on the same plane as Fig. 2, and illustrating a modification of my invention.

Similar letters of reference designate corresponding parts in both figures.

A designates the steam-cylinder and B the water-cylinder, which are arranged in line, and the pistons of which are connected by a common piston-rod, C. As the cylinders and their appurtenances form no part of my invention, I will not describe them further than to say that they may be of any suitable or well-known construction as to their valves and appurtenances, and the engine-cylinder A may be constructed for steam or air, and the pump-cylinder B for water or other liquid or fluid.

A′ B′ designate the cylinder-heads, which are shown as separable from the cylinders, and are bolted thereto in the usual way. The width of the flange-joint formed between each head and its cylinder may be of ample extent throughout the circumference, as there is no necessity for reducing its width at any point. Each head is constructed with an ordinary stuffing-box, through which the piston-rod C works.

D designates the rods which form the cradle or connecting-brace between the cylinders, and which are shown as three in number—one being below the piston-rod and the others on opposite sides and somewhat above the horizontal plane of the piston-rod. These rods D may be of wrought-iron or steel, and are shouldered at * and have screw-threaded ends, to which nuts a are applied. The heads A' B' are constructed with lugs or ears b, which are offset sufficiently from their outer sides in a direction lengthwise of the cylinder to enable the nuts a to be introduced readily behind them or between them and the head proper, as is shown in Fig. 1, and said lugs or ears b have in them holes or apertures, which receive through them the ends of the rods D. The rods D being of uniform length between their shoulders *, and the outer faces of the lugs or ears b having an equal projection from the inner face of the head, it will be seen that the cylinders, when the heads are bolted to them, will be and remain absolutely in line. As here shown, the lugs or ears b are so connected with the heads in the process of casting as to form cavities or pockets b*, open at the sides, which are presented radially outward, as seen in Fig. 2, and these pockets or cavities receive the nuts a. By this construction the strength of the connection between the lugs or ears b and heads is increased, and the appearance of the heads is enhanced.

In assembling the parts the nuts a are placed in position behind the lugs or ears b, and the rod ends are then inserted and screwed into the nuts, or the nuts are screwed upon them. The nuts may be started or turned in screwing them on or off by means of a chisel and hammer, and the rods may be held by tongs against turning.

When the heads are made separable from the cylinders, the cylinders may be removed for repair or renewal by simply unbolting them from the heads A' B'; but the invention is not restricted to the separable heads, as the lugs or ears b might be formed on a head cast integral with a cylinder.

In lieu of screw-threading the ends of the rods D, and employing devices consisting of nuts a, I may form in them slots or mortises f, into which are inserted keys f', driven in behind the lugs or ears b, as shown in Figs. 3 and 4.

I am aware of the Patent No. 30,825, granted December 4, 1860, to J. B. Johnson, and make no claim to anything therein shown as of my invention. In that patent the rods forming the cradle are secured at the ends by nuts and shoulders in lugs or ears projecting transversely from the cylinders beyond their heads, and hence the heads must either be notched or recessed at their edges to receive the rods, which would reduce the width of joint of the head, or the rods must be spread and set at such distance from the center of the cylinder that the head may fit in the circle of the rods and still have an ample joint on the cylinder. According to my invention the head has lugs or ears offset from its face in a direction lengthwise of the cylinder, and the nuts or other securing devices of the rods are placed between the inner sides of these lugs or ears and the head.

What I claim as my invention, and desire to secure by Letters Patent, is—

1. The combination, with a cylinder having its head provided with lugs or ears offset from its face in a direction lengthwise of the cylinder, of rods forming a cradle, and having the ends shouldered and inserted through said lugs or ears, and securing devices applied to the rods behind said lugs or ears and between them and the head, substantially as herein described.

2. The combination, with a cylinder having its head provided with lugs or ears offset sufficiently therefrom in a direction lengthwise of the cylinder to receive nuts behind them and between them and the head, of rods forming a cradle, and having shouldered and screw-threaded ends, which extend through said lugs or ears and receive said nuts upon them, substantially as herein described.

3. The combination, with a cylinder and a head separable therefrom, and provided with lugs or ears offset sufficiently therefrom in a direction lengthwise of the cylinder to receive nuts behind them and between them and the cylinder, of rods forming a cradle, and having shouldered and screw-threaded ends, which extend through said lugs or ears and are engaged with said nuts, substantially as herein described.

4. The combination, with a cylinder and cylinder-head having lugs or ears b offset therefrom in a direction lengthwise of the cylinder, and forming pockets or cavities b* behind them, of the shouldered rods D and nuts a, substantially as herein described.

5. The combination, with two cylinders arranged in line and having heads provided with lugs or ears offset therefrom in a direction lengthwise of the cylinders sufficiently to receive nuts behind them and between them and the heads, of a cradle connecting the cylinders, and composed of rods having shouldered and screw-threaded ends extending through said lugs or ears and receiving the nuts upon them, substantially as herein described.

WM. H. WORTHEN.

Witnesses:
GEORGE L. MATHER,
WILLARD J. GOULD.